US006944201B2

(12) United States Patent
Bunting et al.

(10) Patent No.: US 6,944,201 B2
(45) Date of Patent: Sep. 13, 2005

(54) COMPACT ULTRA FAST LASER

(75) Inventors: Udo Bunting, Hohenems (AT); Daniel Kopf, Altach (AT)

(73) Assignee: High Q Laser Production GmbH, Hohenems (AT)

( * ) Notice: Subject to any disclaimer, the term of this patent is extended or adjusted under 35 U.S.C. 154(b) by 0 days.

(21) Appl. No.: 10/250,670

(22) PCT Filed: Jan. 24, 2002

(86) PCT No.: PCT/EP02/00713

§ 371 (c)(1),
(2), (4) Date: Aug. 6, 2003

(87) PCT Pub. No.: WO02/060020

PCT Pub. Date: Aug. 1, 2002

(65) Prior Publication Data

US 2004/0047387 A1  Mar. 11, 2004

Related U.S. Application Data

(63) Continuation-in-part of application No. 09/768,167, filed on Jan. 24, 2001, now abandoned, which is a continuation of application No. 09/489,964, filed on Jan. 24, 2000, now abandoned.
(60) Provisional application No. 60/146,472, filed on Jul. 30, 1999.

(51) Int. Cl.[7] .............................................. H01S 3/091
(52) U.S. Cl. ............................. 372/70; 372/11; 372/18; 372/20
(58) Field of Search .............................. 372/11, 18, 20, 372/43–50, 70, 98

(56) References Cited

U.S. PATENT DOCUMENTS 5,103,457 A    4/1992  Wallace et al.
5,237,577 A    8/1993  Keller et al.
5,434,873 A  * 7/1995  Delfyett, Jr. .................. 372/18
5,987,049 A  * 11/1999 Weingarten et al. .......... 372/70
6,256,328 B1   7/2001  Delfyett et al.
6,393,035 B1 * 5/2002  Weingarten et al. .......... 372/18

FOREIGN PATENT DOCUMENTS

EP           0805529 A    11/1997
EP         0 826 164 B1    3/1998
WO       WO 00/45480 A2    8/2000

OTHER PUBLICATIONS

Kopf, D. et al., *1.1–w cw Cr:LiSAF laser pumped by a 1–cm diode array*, Optics Letter, vol. 22, No. 2, pp. 99–101. Jan. 1997.

Keller, U. et al., *Semiconductor Saturable Absorber Mirrors (SESAM's) for Femtosecond to Nanosecond Pulse Generation in Solid–State Lasers* "Lee Journal of Selected Topics in Quantum Electronics," vol. 2, No. 3. pp. 435–452, Sep. 1996.

(Continued)

*Primary Examiner*—Minsun Oh Harvey
*Assistant Examiner*—Delma R. Flores-Ruiz
(74) *Attorney, Agent, or Firm*—Oliff & Berridge, PLC

(57) ABSTRACT

The solid state laser comprises a laser gain medium (1), pumping means for pumping the laser gain medium, and a laser cavity having a first end (3) and a second end (17), wherein the laser gain medium is at, or in the vicinity of, said first end (3) of said cavity. A semiconductor saturable absorber mirror (SESAM) can be placed at the second end (17) of the cavity. The laser gain medium can comprise at least one face for receiving pumping energy from the pumping means, the face being made reflective at a laser frequency of the laser, so that it can form the first end of the laser cavity. The resulting setup used for generating femtosecond laser pulses.

39 Claims, 9 Drawing Sheets

OTHER PUBLICATIONS

D. Kopf, F. X. Kartner, and U. Keller, "Diode–pumped mode–locked Nd: glass lasers with an antiresonant Fabry–Perot saturable absorber", *Optical Society of America,*, vol. 20, No. 10, 1995.

D. Kopf, K. J. Weingarten, L. R. Brovelli, M. Kamp, and U. Keller, "Diode–pumped 100–fs passively mode–locked Cr: LiSAF laser with an antiresonant Fabry–Perot saturable absorber", *Optical Society of America*, vol. 19, No 24, 1994.

C. Homminger, G. Zhang, and U. Keller, "Femtosecond Yb: YAG laser using semiconductor saturable absorbers", *Optical Society of America*, vol. 20, No 23, 1995.

S. Tsuda, W. H. Knox, E. A. de Souza, W. Y. Jan, and J. E. Cunningham, "Low–loss intracavity AlAs/AlGaAs saturable Bragg refector for femtosecond mode locking in solid–state lasers", *Optical Society of America*, vol. 20, No. 12, 1995.

D. Kopf, Th. Strassle, G. Zhang, F. X. Kartner and U. Keller, "Diode–pumped femtosecond solid state lasers based on semiconductor saturable absorbers", *SPIE*, vol. 2701/11.

J. Aus der Au et al., "Femtosecond Diode–pumped Nd:Glass Laser with 1–W Average Output", May 1998, CLEO '98, p. 433.

K. Gabel et al., "295 MHz, Diode–pumped, Mirror Dispersion–controlled Femtosecond Laser", May 1998, CLEO '98, p. 157.

W. Jiang et al., "Femtosecond Periodic Gain Vertical Cavity Laser", Jan. 1993, IEEE Photonic Technology Letters, vol. 5, No. 1, pp. 23–25.

J. Aus der Au et al., "New Technique for Dispersion Compensation in Compact Femtosecond Lasers", May 1999, CLEO '99, pp. 459–460.

D. Kopf et al., "Diode–pumped Femtosecond Solid State Lasers Based on Semiconductor Saturable Absorbers", SPIE Proceedings, *Generation, Amplification, and Measurement of Ultrashort Laser Pulses III*, Jan. 28–30, 1996, pp. 11–22.

P. Paschotta et al., "Double–chirped Semiconductor Mirror for Dispersion Compsensation in Femtosecond Laser," Appl. Phys. Lett., vol. 75, No. 15, Oct. 1999, pp. 2166–2168.

R. Paschotta et al., "Power–scalable Femtosecond Thin Disk Yb:YAG Lasers", Conference Digest 2000 Conference on Lasers and Electro–optics Europe (Cat No. OOTH8505), Nice, France, Sep. 10–15, 2000, p. 1 pp. XP002221369, 2000, Piscataway, NJ, US IEEE, USA ISBN: 0–7803–6319–1.

F. Bunner et al., "Diode–pumped Femtosecond Yb:KGd(WO$_4$)$_2$ Laser With 1.1–W Average Power", Optics Letters, Optical Society of America, Washington, US, vol. 25, No. 15, Aug. 1, 2000, pp. 1119–1121, XP000968506, pp. ISSN:0146–9592.

O. G. Okhotnikov et al., "Sable Single– and Dual–Wavelength Fiber Laser Mode Locked and Spectrum Shaped by a Fabry–Perot Saturable Absorber", Optics Letters, Optical Society of America, vol. 25, No. 22, Nov. 15, 2000, pp. 1624–1625.

M. Jiang et al., "Nonlinearly Limited Saturable–Absorber Mode Locking of an Erbium Fiber Faser", Optics Letters, Optical Society of America, vol. 25, No. 15, Aug. 1, 2000, pp. 1119–1121.

* cited by examiner

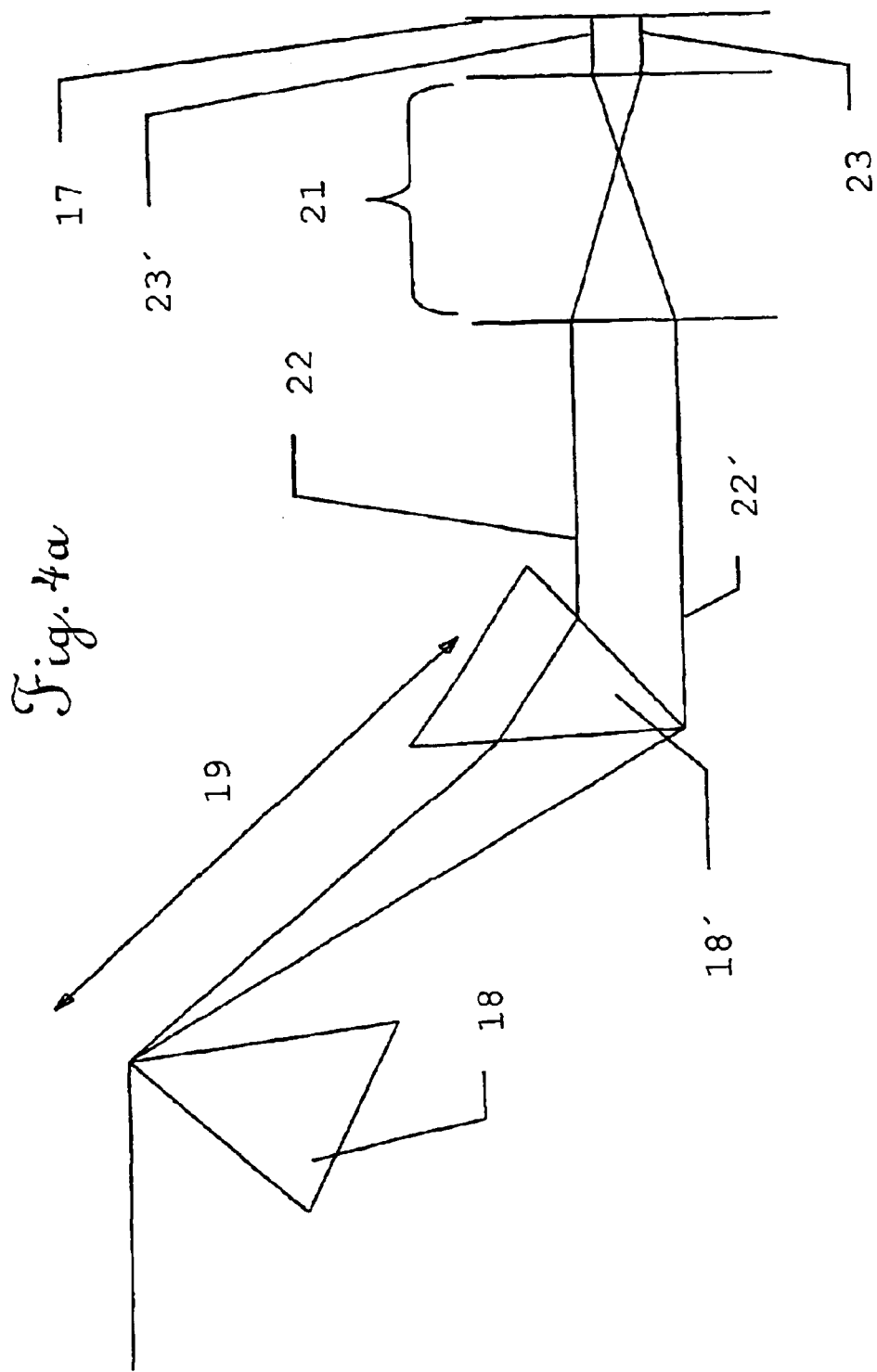

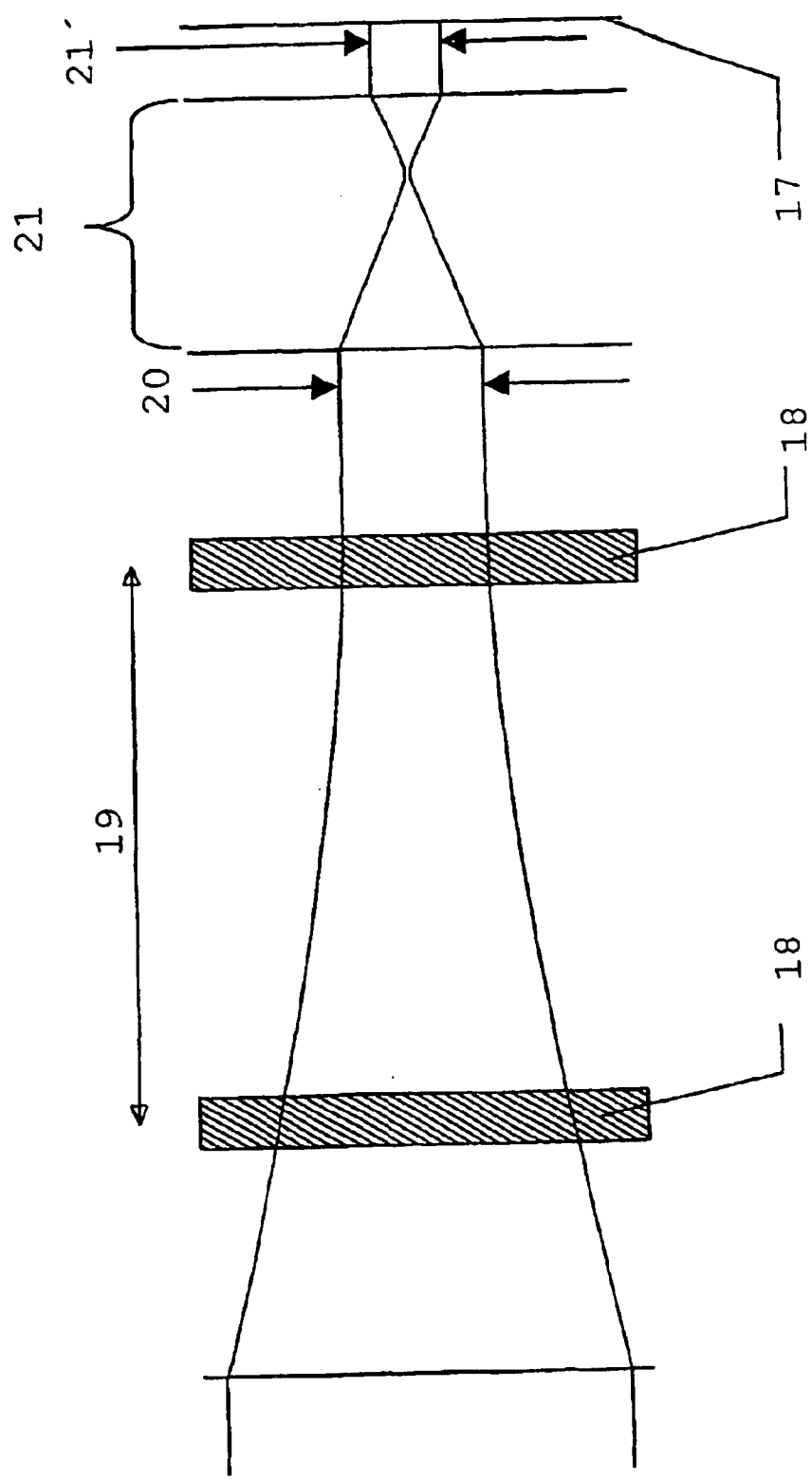

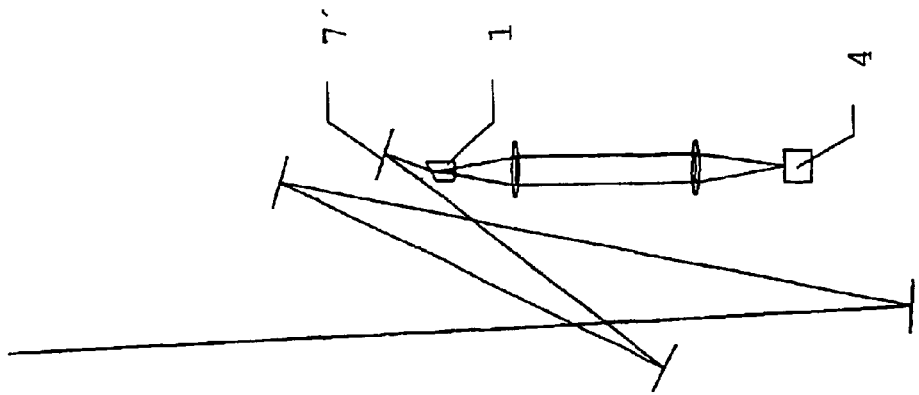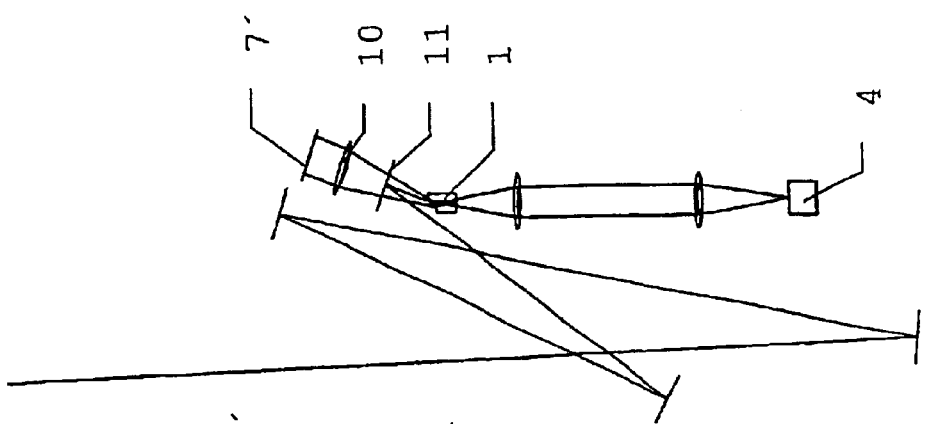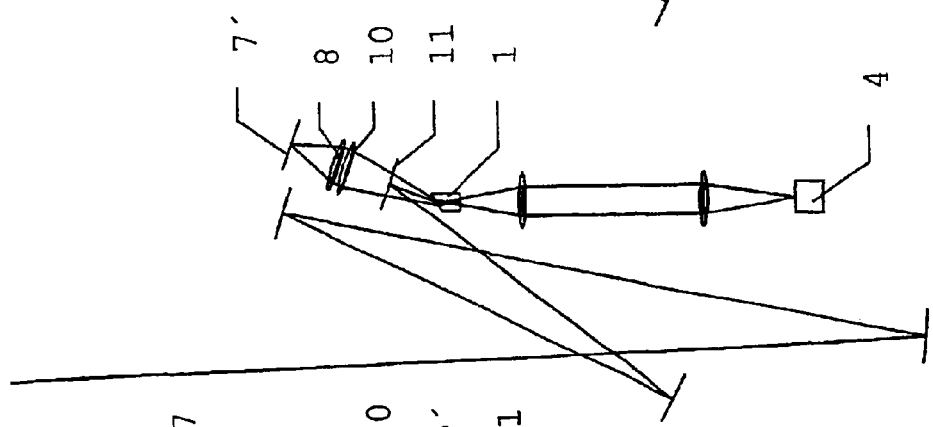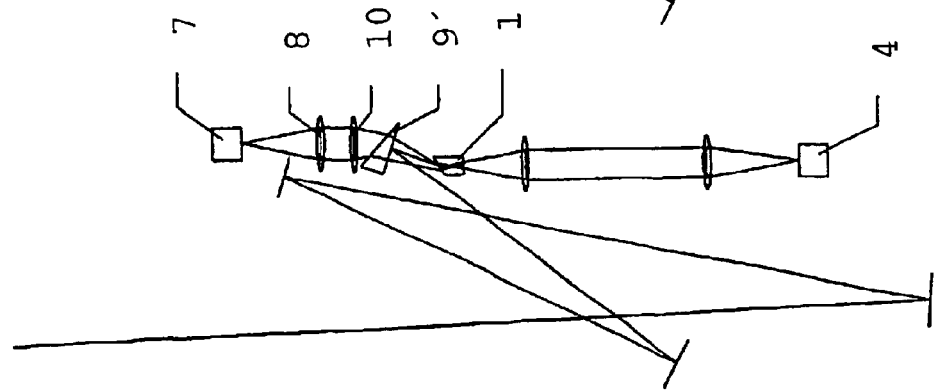

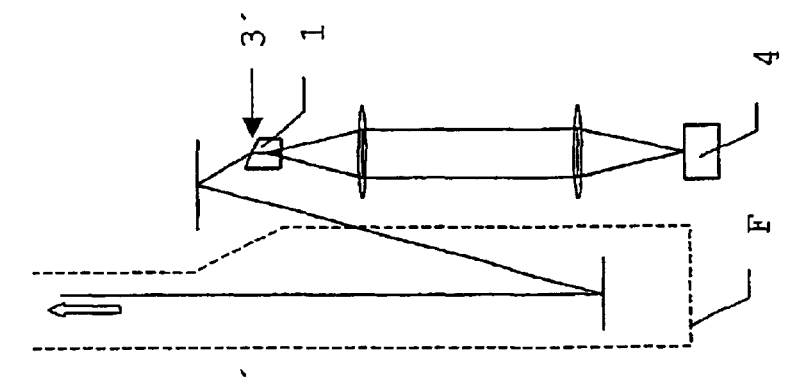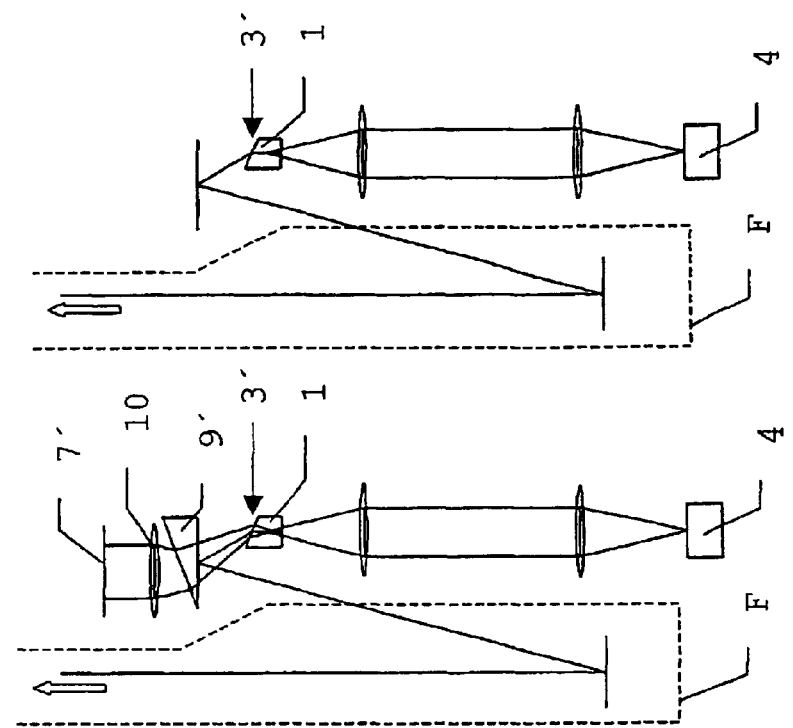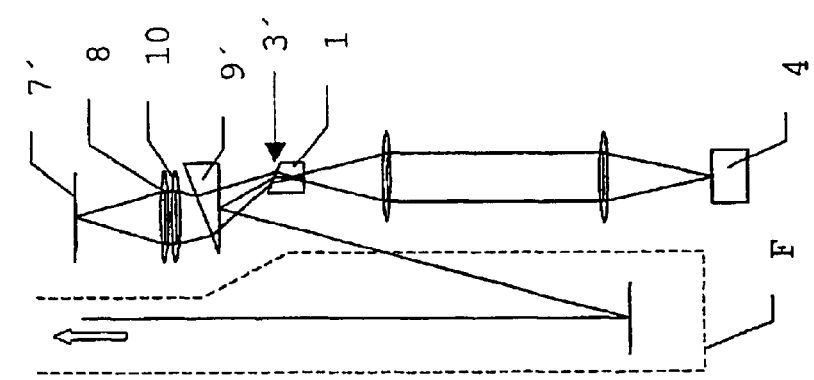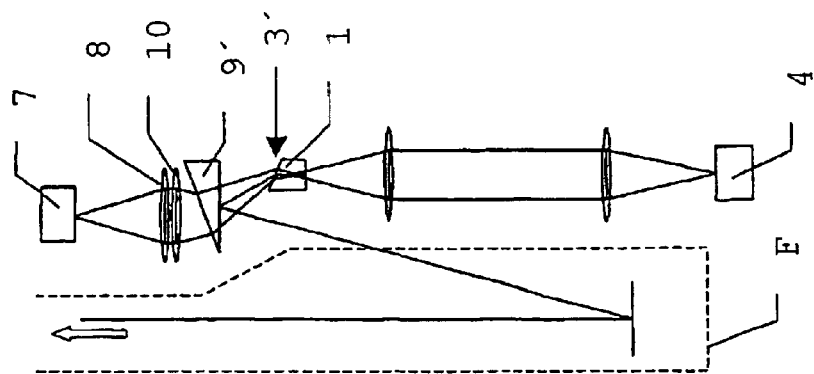

COMPACT ULTRA FAST LASER

This application is the U.S. National Phase of International Application No. PCT/EP02/00713, which is turn is a continuation-in-part of U.S. patent application Ser. No. 09/768,167, filed Jan. 24, 2001, now abandonded, which in turn is a continuation-in-part of U.S. patent application Ser. No. 09/489,964, filed Jan. 24, 2000, now abandonded which in turn claims the benefit of U.S. Provisional Patent Application No. 60/146,472, filed Jul. 30, 1999.

FIELD OF THE INVENTION

This invention relates to compact solid state lasers.

BACKGROUND OF THE INVENTION

Femtosecond lasers are usually more complicated than other lasers emitting continuous-wave, Q-switched, or picosecond radiation. One reason for this is that femtosecond generation requires laser materials with a spectrally broad emission band, in comparison for example to the well-known laser material Nd:YAG, leaving a limited number of laser materials suitable for femtosecond generation. Additionally, femtosecond lasers need some group velocity dispersion compensation, which usually requires additional intra cavity elements, such as a prism pair, thereby adding complexity to the system. An example of a femtosecond laser is the green-pumped Ti:sapphire laser. More compactness is obtained by directly diode pumping suitable laser materials, such as Nd:glass, Cr:LiSAF, Yb:glass, etc (see for example in D. Kopf, et al., "Diode-pumped modelocked Nd:glass lasers using an A-FPSA", Optics Letters, vol. 20, pp. 1169–1171, 1995; D. Kopf, et al., "Diode-pumped 100-fs passively modelocked Cr:LiSAF using an A-FPSA", Optics Letters, vol. 19, pp. 2143–2145, 1994; C. Hönninger, et al., "Femtosecond Yb:YAG laser using semiconductor saturable absorbers", Optics Letters, vol. 20, pp. 2402–2405, 1995). These laser systems, however, are not perfectly compact in the sense that they usually use two laser diodes as pump sources that are imaged into the laser crystal using imaging optics. The latter are relatively large in size and could still be made considerably more compact. Furthermore, the resonator comprises two arms that have to be aligned accurately with respect to each other and with respect to the pump beam, respectively, resulting in a number of high-accuracy adjustments to be performed.

A setup of this type is known from U.S. Pat. No. 5,987,049. This patent discloses a pulsed solid-state laser comprising a two-armed optical resonator with a solid-state laser medium and a semiconductor saturable absorber mirror device (SESAM) placed inside. A prism pair is incorporated for dispersion-compensating purposes. The achievable compactness of the setup is limited due to the positions of the SESAM and the prism pair at each end of the cavity arms. Quite commonly, focusing lenses with a focal length of 75 mm or longer are used to focus the pump light into the laser crystal through one of the curved cavity mirrors, following a delta-type laser cavity scheme. Such a cavity scheme essentially does not allow for straight-forward size reduction of the pump optics. Another approach (see for example S. Tsuda, et al., "Low-loss intracavity AlAs/AlGaAs saturable Bragg reflector for femtosecond mode locking in solid-state lasers", Optics Letters, vol. 20, pp. 1406–1408, 1995) places the laser medium at the end of the laser cavity, thereby allowing for more compact pump focusing optics with a potentially shorter working distance and reducing the number of adjustments required. However, since one cavity end is taken by the laser medium, both the semiconductor element (semiconductor saturable absorber mirror, SESAM) and the prism sequence for dispersion compensation need to be placed toward the other end of the laser resonator. Since the spot size on the SESAM needs to be small enough for saturation in that setup, the focusing mirror towards that cavity end does not leave enough room for a prism pair to compensate for the group velocity dispersion. However a total of four prisms had to be implemented for that purpose.

SUMMARY OF THE INVENTION

The invention relates to compact solid state lasers. The laser medium is positioned at or close to one end of the laser cavity and pumped by at least one pump source or laser diode. The pumping can be done by one or two laser diodes including imaging optics of compact size (10 cm or less), respectively, due to the arrangement of the cavity end and pumping optics, and is suitable for achieving reasonable gain even from low-gain laser materials. For femtosecond operation, the laser resonator is laid out such that both a semiconductor saturable absorber mirror and a prism pair are located toward the other end of the cavity, and the laser mode on the SESAM and the prism sequence length fulfill the requirements that have to be met for stable femtosecond generation. It is another object of the invention to provide a semiconductor saturable absorber mirror (SESAM) having a structure which comprises a plurality of alternating gallium arsenide (GaAs) and aluminum arsenide (AlAs) or Aluminum gallium arsenide (AlGaAs) layers, each layer having an optical thickness corresponding substantially to one quarter wavelength, a gallium arsenide (GaAs) substrate at a first face of said plurality of alternating layers, a gallium arsenide (GaAs) or AlGaAs structure integrating an absorber layer at a second face of said plurality of alternating layers, and plurality of dielectric layers at a face of said gallium arsenide (GaAs) opposite the one in contact with said second face, whereby the overall structure shows resonant behavior. Such a SESAM may be implemented into a solid state laser as described above. It is a further object of the invention to provide a special setup for a solid state laser, wherein the laser comprises a laser gain medium, pumping means for pumping said laser gain medium, a laser cavity with a semiconductor saturable absorber mirror (SESAM) at one end of said cavity, and wherein said cavity contains a prism pair followed by a telescope.

BRIEF DESCRIPTION OF THE DRAWINGS

The invention and its advantages shall become more apparent from reading the following description of the preferred embodiments, given purely by way of non-limiting illustrative examples with reference to the appended drawings, in which:

FIGS. 4a and 4b are schematic representations of implementations of the cavity of FIG. 2 with a relatively larger prism sequence, followed by an intracavity telescope and the cavity end;

FIGS. 6a through 6d show various embodiments of a second pumping source;

FIGS. 7a through 7d show various embodiments of the second pumping source in combination with a special orientation of a Brewster-cut gain medium to form a compact setup.

DETAILED DESCRIPTION OF THE PREFERRED EMBODIMENTS

Figure 1:
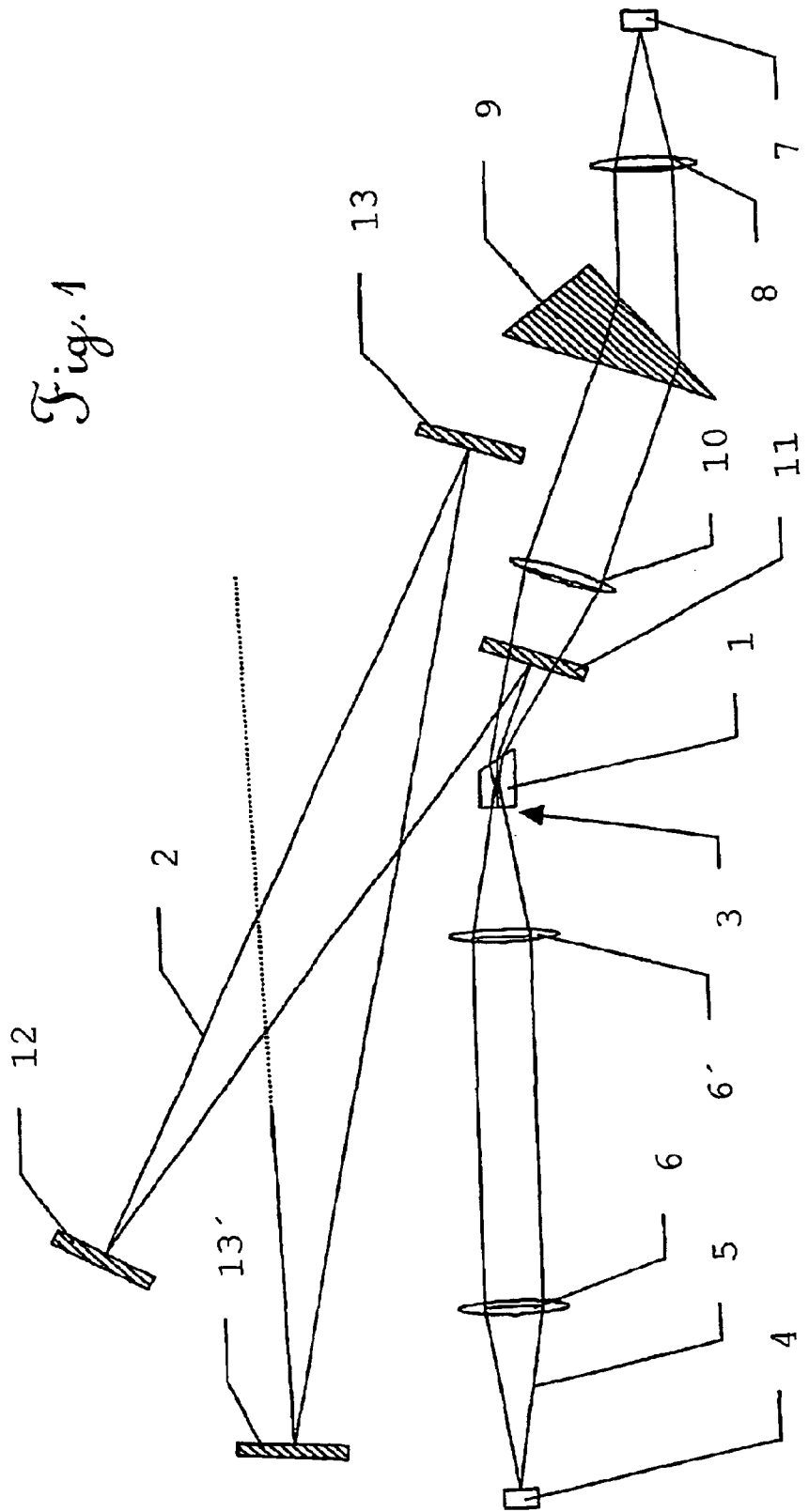
FIG. 1 is a schematic representation of a laser gain setup according to a preferred embodiment of the invention.

The general setup of a compact, ultra-fast laser according to a preferred embodiment of the invention shall be described with reference to FIG. 1. The gain section of the laser setup comprises a laser gain medium 1 which is located in the vicinity of a first end of a laser cavity (see laser cavity mode axis 2). The laser gain medium 1 can even be the laser cavity end itself if one side 3 of the laser material is coated for reflectivity at the laser wavelength. A flat-Brewster-cut laser medium may be used, where the flat side is coated for reflectivity at the laser wavelength and for high transmission at the wavelength of the pump laser diode 4 used in the setup. The laser diode beam is preferably collimated in the (vertical) fast-divergent axis by means of a cylindrical micro lens attached close to the laser diode 4 so that the pump beam 5 diverges at a reduced vertical divergence angle. The pump laser diode 4 can be for example a 100 micron wide laser diode emitting at a power of 1 or more Watts at a wavelength of 800 nm. It serves to pump a laser medium such as Nd:glass. A collimating lens 6 and focusing lens 6' are used to re-image the pump beam into the laser medium 1. Imaging elements including the microlens, and lenses 6 and 6' may be replaced by any imaging optics of similar compactness and imaging properties. Because of the potentially short working distance between lens 6' and the laser medium 1, the pump elements 4,6,6' can cover as short a distance, on the order of 10 cm or less.

The setup uses a second pump source comprising a laser diode 7, collimating lens 8, prism 9, focusing lens 10, and dichroic mirror 11. The pump beam of laser diode 7 is first collimated with lens 8 and then enters prism 9. When the beam emerges from the prism 9, it has been expanded in the tangential plane, as indicated in FIG. 1. This results in a smaller spot in air after focusing lens 10. One or the other of these laser diodes, or both combined, may produce a pump intensity of 10 kW per square centimeter or more. When entering the laser medium 1 through the Brewster face, however, the spot will be expanded again due to the Brewster face refraction. Therefore the prism 9 is used to pre-compensate the expansion due to the Brewster face, which results in similar spot sizes within the laser medium 1 from both pump sources. Additionally, the prism 9 is used to compensate for the beam axis angle due to the Brewster face of the laser medium. The pump source comprising laser diode 7, lens 8, prism 9, and lens 10 can have a degree of compactness similar to that of the first pump source, assuming that dichroic mirror 11 is placed close enough to the laser medium 1, reducing the working distance between the lens 10 and the laser medium. The dichroic mirror 11 is highly transmissive for the pump wavelength of laser diode 7 and highly reflective for the laser wavelength. In this way, the resonator mode 2 is directed from the laser medium 1 towards a curved cavity mirror 12 and some further plane folding mirrors 13 and 13', etc., for example. When the focus spot of the pump sources 4 and 7 is chosen to be located within the laser medium 1, this pump arrangement is suitable for pumping low-gain laser materials such as Nd:glass, Cr:LiSAF, Yb:glass, Yb:YAG, Yb:KGW, etc (low-gain meaning less gain than Nd:YAG). This pump arrangement can therefore be used for pumping broad emission band laser materials suitable for femtosecond generation. It may however also be used for pumping any solid state laser material for other purposes including continuous wave, Q-switched, or picosecond operation.

Figure 2:
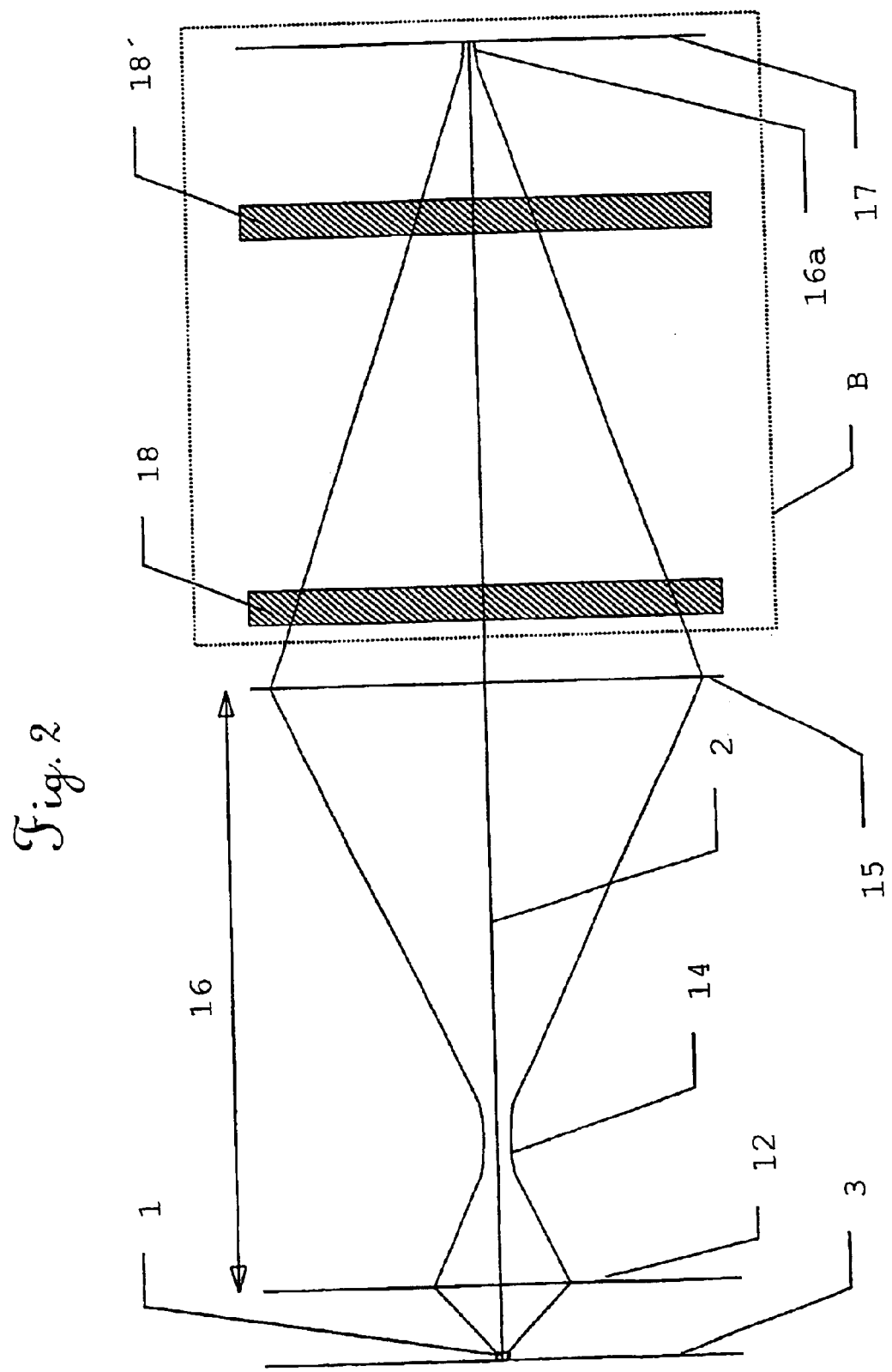
FIG. 2 is a schematic representation of an unfolded propagation of the laser mode cavity of a femtosecond cavity.

For a femtosecond laser setup, above setup can be combined with the laser mode shown in FIG. 2, which illustrates an example of an unfolded propagation of the laser mode throughout a possible femtosecond cavity. The lenses indicate curved cavity mirrors that refocus the cavity mode. Laser medium 1 in the vicinity of one cavity end 3' has a mode radius on the order of 30×45 um (microns). The cavity end 3' may be a mirror with characteristic features similar to those of the coated side 3 of the laser material in FIG. 1. Curved mirror 12 (whose radius of curvature is for example 200 mm) is located some 120 mm away from the laser medium 1, and therefore re-images the cavity mode into a waist 14. The cavity mode then further diverge to a spot size that is on the order of 2–3 mm in diameter at another cavity mirror 15 (whose radius of curvature is for example 600 mm) after a distance 16 of around 1400 mm. The relatively large mode diameter at cavity mirror 15 results in a small mode diameter 16a at the laser cavity end which contains a SESAM (semiconductor saturable absorber mirror) 17. An example of a design for a suitable SESAM is given in D. Kopf, et al., "Diode-pumped femtosecond solid state lasers based on semiconductor saturable absorbers", SPIE Proceedings, "Generation, Amplification and Measurement of Ultrashort Laser Pulses III", 28–30 Jan. 1996, San Jose, Calif., The International Society for Optical Engineering). This laser cavity has a large working distance of around 400 mm between element 15 and 17 such that it can contain a group delay component such as a prism pair 18,18' (shown schematically, see also FIG. 4b) consisting of two SF10 Brewster prisms that are separated by some 350 mm for sufficient group velocity dispersion compensation. The prism pair 18, 18' as group delay component and the SESAM 17 are combined to form a beam influencing system B that is located between the laser medium 1 and an end of the cavity which is identical with the SESAM 17 in this special example. Other suitable group delay components are dispersive mirror structures such as a Gires-Tournois-Interferometer or mulitlayer dielectric mirrors. An example for the use of such devices is disclosed in R. Paschotta, et al., "Double-chirped semiconductor mirror for dispersion compensation in femtosecond laser", Appl. Phys. Lett., Vol. 75, No. 15, October 1999, 2166–2168.

Figure 3:
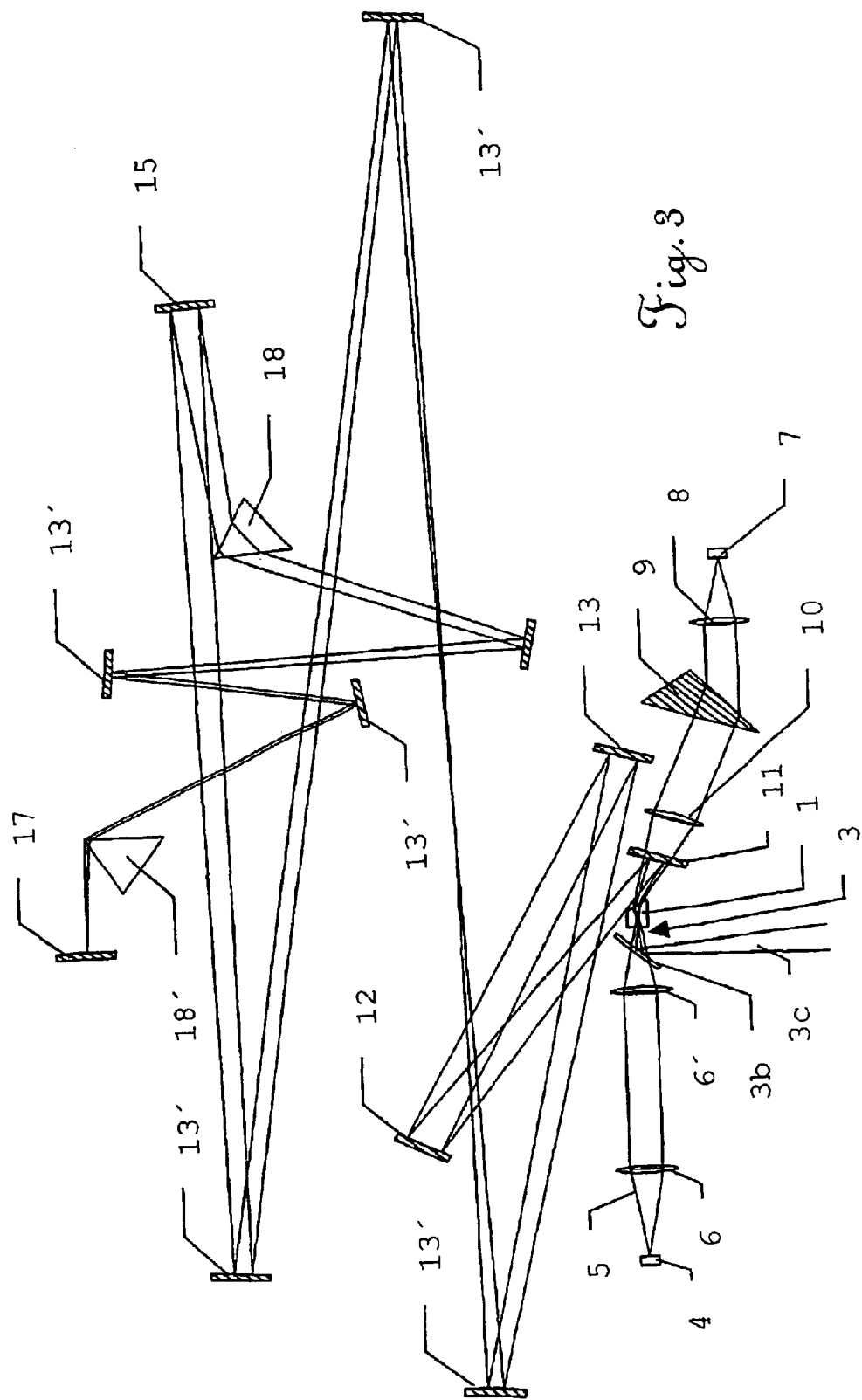
FIG. 3 is a schematic representation of an implementation of the cavity of FIG. 2 forming a small-size setup.

The cavity of FIG. 2 can be folded with plane highly reflective mirrors or dispersive mirror structures at any location as required to fit the setup into small boxes. One example of a final small-size setup is shown in FIG. 3. Here the surface 3 of the laser medium 1 is made partially transmissive for the laser wavelength such that a fraction of the intracavity power is outcoupled and furthermore separated from the incident pump beam by dichroic mirror 3b, resulting in laser output beam 3c. Prism sequences that are considerably longer than those in above setup can be achieved at the expense of a larger spot size at the end of the prism sequence.

FIGS. 4a and 4b illustrate such examples of prism sequences. For such longer prism sequences 19, for example 500–1000 mm long or longer, the spot size 20 at the SESAM could be too large for achieving saturation at femtosecond operation as required for stable ultra fast performance. To solve this problem, it can be useful to extend the cavity by a telescope 21. In this way, the mode size reduces according to the telescope factor to a mode size 21' (FIG. 4a), where the SESAM is positioned. Simultaneously, the parallelism between two dispersed beams 22 and 22" is preserved after the telescope, and corresponding beams 23 and 23' (FIG. 4a) are perpendicular to the end mirror (which is the SESAM) 24 as required for the lasing condition and for obtaining negative group velocity dispersion from the prism sequence 19. Prism sequences of considerable length can also be used in combination with a special SESAM structure such that saturation is obtained at lower energy densities for stable ultra fast laser operation.

Figure 5:
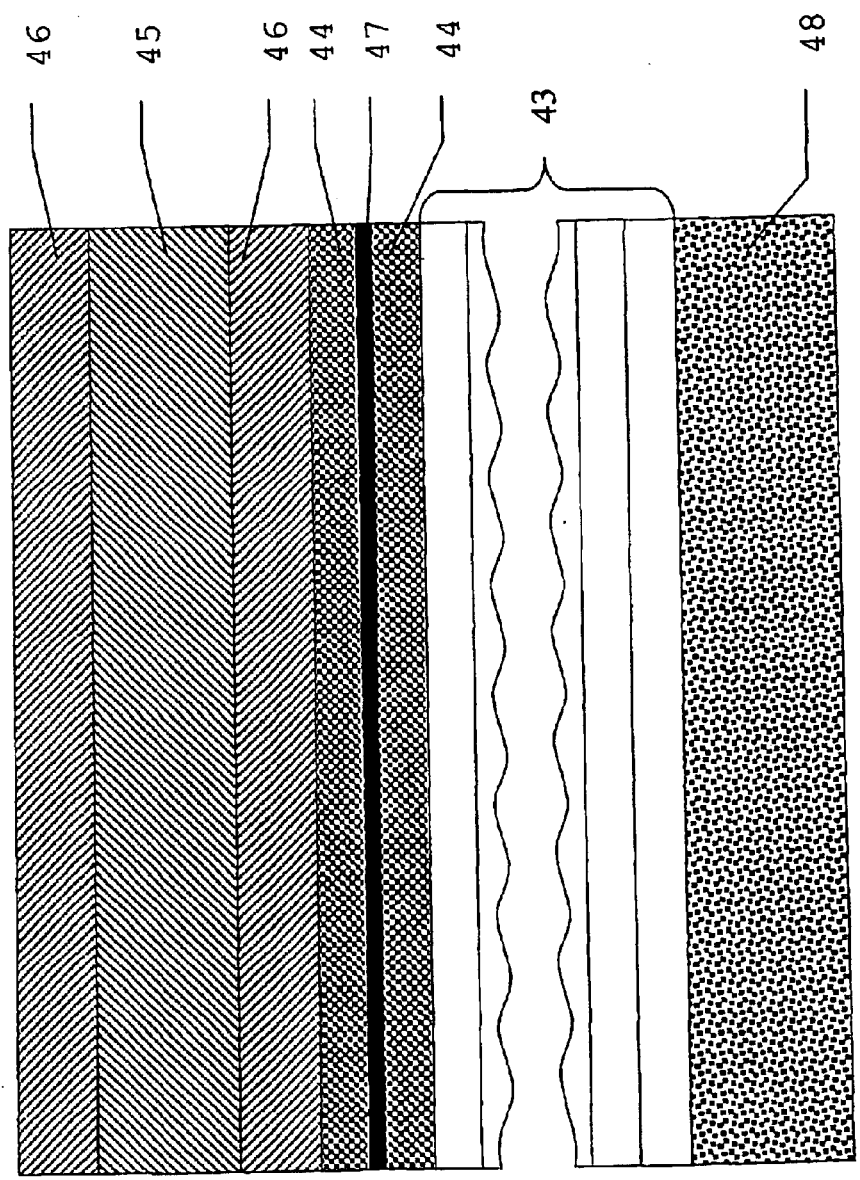
FIG. 5 shows an example of a semiconductor saturable absorber structure which can be used in combination with prism sequences.

FIG. 5 shows an example of such a semiconductor saturable absorber structure, representing the layers along the surface normal to its surface. Firstly, 30 pairs of layers of alternating gallium arsenide (GaAs) and aluminum arsenide (AlAs) layers 43 each with an optical thickness corresponding to a quarter wavelength are applied onto a gallium arsenide (GaAs) substrate 48. This can be achieved by means of growth process using molecular beam epitaxy (MBE). However, other known epitaxy processes and usual in this field are also suitable. The GaAs/AlAs pairs of layers are transparent for the laser wavelength of 1064 nm and result, in the example of FIG. 5, in a Bragg mirrorlike coating structure with a high reflection factor close to 100% with a wavelength of 1064 nm if the thickness of GaAs is selected at approx. 72.3 nm and that of AlAs at approx. 88 nm, each corresponding to about an optical quarter wavelength. Then, a further GaAs layer 44 integrating an approx. 10 nm thin absorber layer of indium gallium arsenide (InGaAs) material is assembled onto this standard GaAs/AlAs Bragg mirror structure. The optical total thickness of this GaAs layer with integrated absorber layer 47 corresponds to half a wavelength, that is the physical film thickness is approx. 145 nm. The indium content of the absorber layer 47 is determined so that an absorption is obtained at the laser wavelength of 1064 nm, that is the band-edge is approx. 1064 nm or a few 10 nm higher than the laser wavelength, e.g. at 1064–1084 nm. This corresponds to an indium content of about 25 percent. With higher intensity and pulse energy density, a saturation of the absorption of this absorber layer 47 occurs, i.e. it is lower. In the case of particularly thin layers of less than 20 nm thickness, by additionally finely adjusting the indium content, the exciton peak near the band edge, generated by the exciton absorption behaviour of thin layers to be quantizised, can be adjusted exactly to the laser wavelength, resulting again in an even more pronounced saturable absorption at that wavelength. Finally, another three or more pairs of dielectric layers transparent for the layer wavelength are applied, beginning with that layer 45 having a higher index of refraction n=2.02 and continuing with that layer 46 having a lower index of refraction of 1.449 at a wavelength of 1064 nm. The process of electron beam coating, widespread in the optical coating field, is suitable to achieve this. Other optical coating processes, such as for example ion beam sputtering, are also suitable and can have the advantage of resulting in lower losses. As optical layer materials, those with an index of refraction of 1.449 and 2.02 at a wavelength of 1064 nm were used. However, a large number of other materials can be used as long as adhesion to GaAs and transparency at the laser wavelength are ensured. Because the three or more final dielectric pairs have a reversed order in terms of their index of refraction, with respect to the order of the refractive indexes of the layers underneath, the structure is at resonance. By virtue of the resonant saturable absorber mirror structure, this device has a saturation fluence which can be on the order of a few microjoules per square centimeter (depending on the number of dielectric top layers), which is considerably lower than those of existing SESAMs, and can therefore be well suited for femtosecond or pulsed laser generation from setups where the laser mode on the saturable absorber device is usually too large for saturation. Thanks to the resonant structure, one single or a low number of single thin saturable absorber layers introduce an increased saturable absorption for the overall device in comparison to those structures which do not use a resonant structure. When the saturable absorber layers introduce strain due to a lattice mismatch (which is the case for Indium Gallium Arsenide within GaAs), this structure helps reduce strain without reducing the saturable absorption effect for the overall device, resulting in less material defects and in improved long-term properties of the device.

FIGS. 6a to 6d show various special embodiments of the pumping means. FIG. 6a is schematic setup, which is almost identical to the setup in FIG. 1, comprising pumping means with two different pumping sources 4 and 7, e.g. two semiconductor lasers, located at both ends of the laser medium 1. In FIG. 6b the second pumping source is replaced by a reflective element 7' and a dichroic mirror 11 substitutes the prism 9. The pump light of the first pumping source 4 passes through the laser medium and is focused onto the reflective element 7' by a combination of a second collimating lens 8 and a second focusing lens 10. This setup couples the first focus of the first pumping source 4 with the second focus of the reflected pump beam as a second pumping source. The pump beam of the first pumping source 4 is reflected into itself. A movement of the first pumping source and therefore of the first focus causes an according movement of the second focus on the same order. Therefore the two foci remain aligned without a necessity for an adjustment. FIG. 6c shows the setup of FIG. 6b with a reflection of the first pump beam by the reflective element 7' after a collimation. A movement of the first pumping source leads to a movement of the second focus on the same order but in the opposite direction. Therefore the relative displacement of both foci is twice the initial displacement of the first focus. In FIG. 6d the reflective element 7' substitutes the dichroic mirror to form a very compact setup without any second pumping source.

FIGS. 7a to 7d are schematic setups with a special orientation of a Brewster-cut laser medium 1. The laser cavity comprises a sequence of folding mirrors defining a folded part F. The laser medium 1 shows a Brewster-cut design with a Brewster face 3'. This Brewster face 3' is orientated looking away from the folded part F ("outwards orientation") to allow a very compact cavity setup due to the flat angle of the beam reflected by the prism 9'. This angle is measured with respect to the axis of the laser medium 1. The different FIGS. 7a to 7d show the different setups of pumping means as disclosed in FIGS. 6a to 6d. As shown in these examples the special orientation of the Brewster-face 3' is not limited to the use of a beam influencing system.

Figure 8:
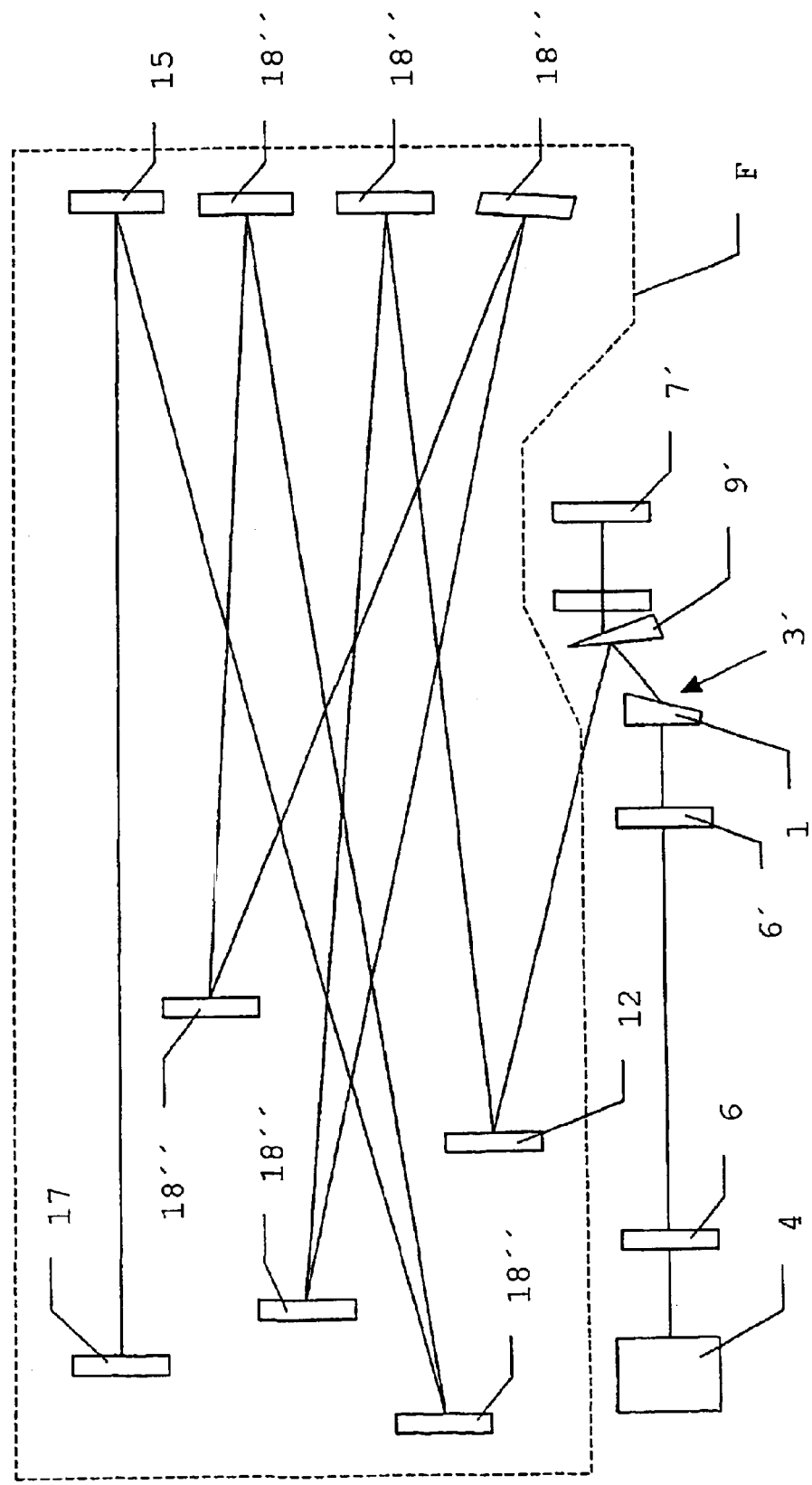
FIG. 8 is an example of a setup with a plurality of dispersive mirror structures forming a folded cavity

FIG. 8 is a schematic view of a multiple folded compact laser cavity with an outwards orientated Brewster-face 3'. The optical path inside the folded part F of the laser cavity is defined by plurality of dispersive mirror structures 18" with negative group delay dispersion. These mirror structures combine the features of group delay dispersion compensation and reflection to replace both, prisms and folding mirrors. The beam influencing system now comprises the SESAM 17 and the dispersive mirror structures 18".

While there has been described herein the principles of the invention, it is to be clearly understood to those skilled in the art that this description is made only by way of example and not as a limitation to the scope of the invention. Accordingly, it is intended, by the appended claims, to cover all modifications which fall within the spirit and scope of the invention.

The application of pump setups as shown in FIGS. 6a to 6d and the special orientation of a Brewster-face as shown in FIGS. 7a to 7d is not restricted to their combined use or in combination with a beam influencing system. Although the combination of these features allows a very compact laser design these setups are also applicable to a variety of different laser devices.

What is claimed is:

1. A solid state laser comprising:
   a laser gain medium (1);
   pumping means for pumping said laser gain medium (1);
   a laser cavity; and
   a beam influencing system (B) with a semiconductor saturable absorber mirror (17), wherein
   said beam influencing system (B) is located between said laser gain medium (1) and a first end of said laser cavity and
   said beam influencing system (B) comprises at least two prisms (18, 18') or a telescope.

2. The solid state laser according to claim 1, wherein
   said beam influencing system (B) comprises said two prisms (18, 18');
   said semiconductor saturable absorber mirror (17) is located at one end of said laser cavity; and
   said laser cavity comprises a telescope, wherein said prism pair (18, 18') is followed by said telescope.

3. The solid state laser according to claim 1, wherein a laser mode within said beam influencing system (B) is convergent in a sense that at least one diameter of the cross section of said laser mode is decreasing towards said semiconductor saturable absorber mirror (17).

4. The solid state laser according to claim 1, wherein said beam influencing system (B) comprises at least a dispersive mirror structure (18"), such as a Gires-Toumois Interferometer or a multiplayer dielectric mirror.

5. The solid state laser according to claim 1, wherein said beam influencing system (B) is at, or in the vicinity of, said first end.

6. The solid state laser according to claim 1, wherein said laser gain medium (1) is at, or in the vicinity of, a second end of said laser cavity.

7. The solid state laser according to claim 1, wherein said laser cavity is folded by highly reflective mirror means (13, 13') and/or by at least one dispersive mirror structure (18") for integration in a compact setup application.

8. The solid state laser according to claim 7, wherein
   said laser gain medium (1) comprises a Brewster face (3') and
   said mirror means (13, 13') and/or said at least one mirrors structure (18") define a folded part of said cavity and
   said gain medium (1) is orientated with said Brewster face (3') looking away from said folded part.

9. The solid state laser according to claim 1, wherein said laser gain medium (1) comprises at least a first face (3) for receiving pumping energy from said pumping means, said first face (3) being made reflective at a laser frequency of said laser, whereby said laser gain medium (1) forms said second end.

10. The solid state laser according to claim 9, wherein said first face (3) is a flat face of a flat-Brewster-cut laser gain medium (1).

11. The solid state laser according to claim 9, wherein said laser gain medium (1) comprises a second face and said pumping means comprise:
    a first part with a first pumping source (4) and
    a second part,
    said first pumping source (4) producing a first pumping beam at said first face (3) and said second part producing a second pumping beam at said second face.

12. The solid state laser according to claim 11, wherein the second part comprises a second pumping source (7) or a reflective element (7'), said reflective element (7') reflecting said first pumping beam after a passage of said laser gain medium (1) as said second pumping beam at said second face.

13. The solid state laser according to claim 12, wherein after said passage of said laser gain medium (1) said first pumping beam is collimated or is focused on said reflective element (7').

14. The solid state laser according to claim 11, wherein said second part comprises a second optical path from said second pumping source (7) or said reflective element (7') to said laser gain medium (1), said second optical path comprising:
    a prism element (9) and a dichroic mirror (11) or
    a prism element (9') with a reflecting face.

15. The solid state laser according to claim 14, wherein said second optical path comprises a second collimating lens (8) and a second focusing lens (10).

16. The solid state laser according to claim 9, comprising a first collimating lens (6) and a first focusing lens (6') to re-image said first pumping beam into said laser gain medium (1), with a working distance between said first focusing lens (6') and said first face (3) less than 50 mm.

17. The solid state laser according to claim 9, wherein a first optical path from a said first pumping source (4) to said laser gain medium (1) is on the order of 10 centimeters or less.

18. The solid state laser according to claim 1, wherein at least one beam spot produced by said pumping means is located within said laser gain medium (1).

19. The solid state laser according to claim 1, wherein said laser cavity is a femtosecond cavity.

20. The solid state laser according to claim 1, wherein said laser gain medium (1) has a composition taken from the group comprising: Nd:glass, Cr:LiSAF, Yb:glass, Yb:YAG, Yb:KGW.

21. The solid state laser according to claim 1, wherein said laser gain medium (1) has a composition having a gain equal to or smaller than a gain obtained from the composition Nd:YAG or Yb:YAG, with said gain to be determined as the product of the stimulated emission cross section and the upper laser level life time.

22. The solid state laser according to claim 1, wherein said laser gain medium (1) is a broad emission band laser material suitable for femtosecond laser generation.

23. The solid state laser according to claim 6, wherein said laser gain medium (1) has a mode radius on the order of 30 microns×45 microns.

24. The solid state laser according to claim 1, wherein the pumping means have a pump intensity equal to or greater than 10 kW per square centimeter.

25. The solid state laser according to claim 1, further comprising a first curved mirror (12) at an output of said laser gain medium (1) arranged to re-image and cavity mode into a waist (14).

26. The solid state laser according to claim 1, further comprising a second curved mirror (15) between said waist (14) and said first end.

27. The solid state laser according to claim 26, wherein a distance between said second curved mirror (15) and said first end is on the order of 40 centimeters or longer.

28. The solid state laser according to claim 26, wherein said beam influencing system (B) is located between said second curved mirror (15) and said first end.

29. The solid state laser according to claim 1, wherein said semiconductor saturable absorber mirror (17) is a layered structure comprising:

a plurality of alternating layers (43) of gallium arsenide and a aluminum arsenide or aluminum gallium arsenide, each layer having a thickness corresponding substantially to one quarter wavelength, a substrate (48) of gallium arsenide at a first layer face of said plurality of alternating layers (43), a structure (44) of gallium arsenide of aluminum gallium arsenide integrating an absorber layer (47) at a second layer face of said plurality of alternating layers (43), and a plurality of dielectric layers (45, 46) at a face of said structure (44) opposite the one in contact with said second face, whereby the overall structure show resonant behaviour.

30. A method for generating femtosecond laser pulses using the solid slate laser of claim 1, comprising pumping said laser gain medium by said pumping means.

31. A method for continuous wave or Q-switched laser operation using the solid state laser of claim 1, comprising pumping said laser gain medium using said pumping means.

32. A semiconductor saturable absorber mirror (17) for a solid-state laser, particularly for a solid state laser according to claim 1, said semiconductor saturable absorber mirror (17) having a layered structure comprising:

a plurality of alternating layers (43) of gallium arsenide and aluminum arsenide or aluminum gallium arsenide, each layer having a thickness corresponding substantially at one quarter wavelength, a substrate (48) of gallium arsenide at a first layer face of said plurality of alternating layers (43), a structure (44) of gallium arsenide or aluminum gallium arsenide integrating an absorber layer (47) at a second layer fare of said plurality of alternating layers 43), and a plurality of dielectric layers (45, 46) at a face of said structure (44) opposite the one in contact with said second face, wherein said dielectric layers (45, 46) have a reversed order in terms of their index of refraction, with respect to the order of the refractive indexes of the layers underneath, thereby forming a resonant structure, whereby the overall structure shows resonant behaviour.

33. The semiconductor saturable absorber mirror (17) according to claim 32, wherein said plurality of alternating layers (43) is on the order of 30 in number.

34. The semiconductor saturable absorber mirror (17) according to claim 32, wherein each of said plurality of alternating layers (43) as a thickness respectively of approximately 72.3 nanometers and approximately 88 nanometers.

35. The semiconductor saturable absorber mirror (17) according to claim 32, wherein a totally optical thickness of said structure (44) corresponds to half a wavelength.

36. The semiconductor saturable absorber mirror (17) according to claim 32, wherein said dielectric layers (45, 46) are three or more in number.

37. A solid state laser comprising:

a laser gain medium, pumping means for pumping said laser gain medium, a semiconductor saturable absorber mirror located towards a first end of said cavity, a first curved mirror at an output of said laser gain medium arranged to re-image a cavity mode into a waist:

a second curved mirror between said waist and a second end of said cavity; and a prism pair between said second curved mirror and said second end of said cavity for group velocity dispersion compensation.

38. The solid state laser according to claim 12, wherein said second part comprises a second optical path from said second pumping source (7) or said reflective element (7') to said laser gain medium (1), said second optical path comprising a prism element (9) and a dichroic mirror (11) or a prism element (9') with a reflecting face.

39. The solid state laser according to claim 13, wherein said second part comprises a second optical path from said second pumping source (7) or said reflective element (7') to said laser gain medium (1), said second optical path comprising a prism element (9) and a dichroic mirror (11) or a prism element (9') with a reflecting face.

* * * * *